Nov. 26, 1946. W. C. CALVERT 2,411,840
COMPOUNDING RUBBER HYDROHALIDES, ETC.
Original Filed March 26, 1937
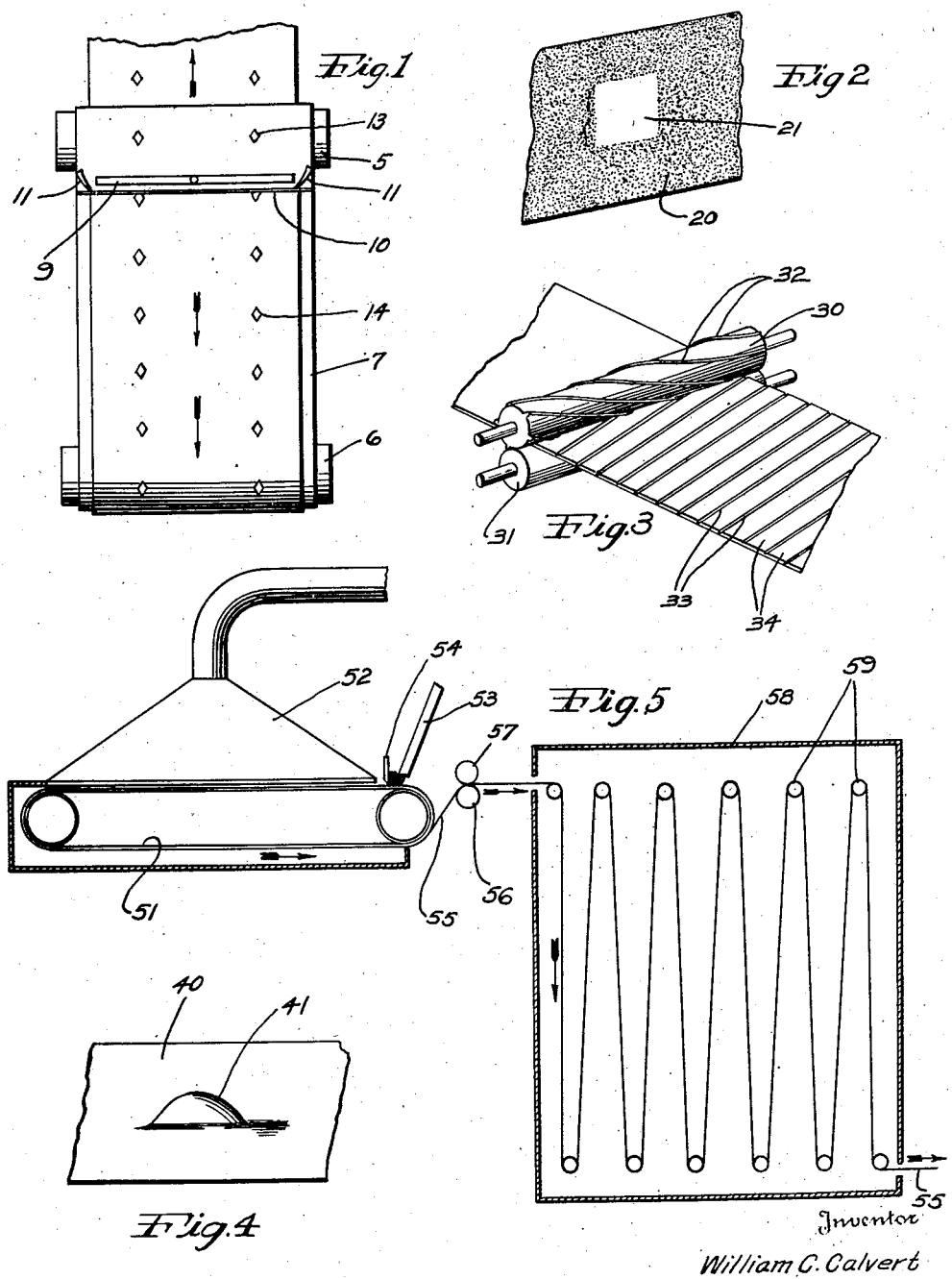
Inventor
William C. Calvert Patented Nov. 26, 1946

2,411,840

UNITED STATES PATENT OFFICE 2,411,840

COMPOUNDING RUBBER HYDRO-HALIDES, ETC.

William C. Calvert, Gary, Ind., assignor to Wingfoot Corporation, Wilmington, Del., and Akron, Ohio, a corporation of Delaware Original application March 26, 1937, Serial No. 133,172. Divided and this application August 2, 1946, Serial No. 687,897

4 Claims. (Cl. 260—738)

This invention relates to the compounding of rubber hydrohalides, viz. rubber hydrochlorides, rubber hydrobromides and rubber hydroiodides, and the treatment of resulting rubber hydrohalide compositions. The invention will be described more particularly as applied to the treatment of rubber hydrochlorides.

In milling and molding and otherwise treating rubber hydrohalides such as rubber hydrochloride when the mechanical manipulation of the rubber hydrochloride is carried out at an elevated temperature it has been found that in many operations the admixture of a basic material with the rubber hydrochloride gives improved results. For example, in milling and then molding rubber hydrochloride it has been found that the addition of inorganic basic materials such as lime and magnesia, etc. give improved products. The use of bases such as hexamethylene tetramine and diphenyl guanidine has likewise been found advantageous. For certain operations it has been found desirable to compound with the rubber hydrochloride and basic material a plasticizing material such as rubber or other softener. Pigments may be milled into the rubber hydrochloride where colored products are desired.

This invention relates more particularly to the compounding of basic materials with rubber hydrohalides by milling and the molding and calendering of compositions comprising rubber hydrohalides and basic materials. But it is to be understood that it is not essential to incorporate basic materials with rubber hydrohalides for all such operations. For example, rubber hydrochloride may be satisfactorily milled at a low temperature in the absence of basic materials. In those instances where the use of a basic material is desirable the amount of basic material required for entirely satisfactory results depends upon the temperature employed, the length of time during which the rubber hydrochloride is subjected to the temperature, etc. For example, in molding a mixture consisting of rubber hydrochloride and an inorganic basic material such as CaO, MgO or PbO, it has been found in general that 10 parts of one of the above bases and 100 parts of rubber hydrochloride can be satisfactorily molded or cured as a thin slab for 20 minutes at 260° F.; whereas 20 parts of the base was preferred for 60 minutes molding at this temperature and 30 parts for 60 minutes molding at 275° F. Molding at such higher temperatures caused blowing on uncompounded rubber hydrochloride and in certain instances caused pitting, etc.

The following materials were milled into 100 parts of rubber hydrochloride and then molded at the times and temperatures indicated as "time in minutes"/"degrees Fahrenheit."

1. 20/260 _____ 10 parts MgO
2. 20/260 _____ 10 parts CaO
3. 20/260 _____ 10 parts PbO
4. 20/260 _____ 20 parts CaO
5. 60/260 _____ 20 parts CaO
6. 20/260 _____ 20 parts MgO
7. 60/260 _____ 20 parts MgO
8. 60/260 _____ 30 parts CaO
9. 60/275 _____ 30 parts CaO
10. 60/260 _____ 30 parts MgO
11. 60/275 _____ 30 parts Mgo It was found that these compositions could be milled under conditions of times and temperatures which would cause evolution of hydrogen chloride from rubber hydrochloride containing no basic material. Other compositions satisfactorily homogeneously milled together and then molded are:

12. 60/220—11 parts vulcanizable rubber stock
13. 60/220—11 parts vulcanizable rubber stock plus 25 parts gas black
14. 60/220—11 parts vulcanizable rubber stock plus 2 parts diphenyl guanidine plus 25 parts gas black
15. 20/220—2 parts diphenyl guanidine
16. 20/220—25 parts gas black
17. 20/220—2 parts diphenyl guanidine plus 25 parts gas black
18. 20/260—5 parts hexamethylene tetramine
19. 20/260—10 parts Ivory soap
20. 60/260—20 parts CaO plus 10 parts cumar
21. 60/260—20 parts CaO plus 10 parts mineral oil
22. 60/260—20 parts CaO plus 10 parts factice
23. 60/260—20 parts CaO plus 10 parts coal tar
24. 60/260—20 parts CaO plus 5 parts hexamethylene tetramine
25. 60/275—20 parts CaO plus 5 parts hexamethylene tetramine
26. 60/260—20 parts CaO plus 20 parts gas black
27. 60/275—20 parts CaO plus 20 parts gas black
28. 60/260—20 parts MgO plus 5 parts hexamethylene tetramine
29. 60/275—20 parts Mgo plus 5 parts hexamethylene tetramine
30. 60/260—20 parts MgO plus 20 parts gas black The vulcanizable rubber stock of Examples 12, 13 and 14 was composed of 100 parts rubber, 1 part mercaptobenzothiazole, 1 part stearic acid, 5 parts zinc oxide and 3 parts sulfur.

31. Somewhat over 1.5 parts glyceryl butyl phthalate were incorporated in 100 parts rubber hydrochloride on a cold mill. By incorporating 10 parts of pale crepe rubber (about 400 plasticity) on a cold mill a product less tough than that containing no rubber was obtained. Four parts of diphenyl guanidine was incorporated into the rubber hydrochloride-glyceryl butyl phthalate mixture on a hot mill. Each of these products was quite flexible. A sheet of the last composition was pressed into felt at 240° F. using 4000 and 9000 pounds pressure. The rubber hydrochloride was pressed almost completely into the felt with the latter pressure.

32. A dark red sheet was obtained by compounding two parts diphenyl guanidine and 0.3 part Oil Red 3B (American Aniline Company) on a hot mill. This was pressed into felt at 240° F. using 2500 and 6000 pounds pressure. A satisfactory product was obtained by pressing into felt at 240° F. with 2500 pounds pressure a composition obtained by sheeting 1.2 parts diphenyl guanidine, 0.1 part Oil Red 3B and 60 parts rubber hydrochloride on a hot mill. The best results are obtained by heating both plates.

33. A good sheet was obtained by milling 1.2 parts diphenyl guanidine into 60 parts rubber hydrochloride and then molding in a press at 240° F., heating 5 minutes before applying the full pressure of 2500 pounds.

34. Fifteen parts butyl stearate was milled into 124 parts rubber hydrochloride and a sheet formed on the mill was then pressed into felt at 240° F. using 2500 pounds pressure. The rubber hydrochloride was quite soft after pressing but hardened on standing.

35. One part pale crepe rubber (400 plasticity) was milled into five parts rubber hydrochloride. A sheet of this was pressed into felt at 240° F. using 2000 pounds pressure. There was practically no indication of rubber hydrochloride decomposition. A light coat of triethanol amine stearate was used on the press without detrimental effect.

36. Rubber hydrochloride was sheeted out on the mill at such a temperature that there was some evidence of decomposition. This was then pressed to felt at 260° F. and 280° F. using 2500 pounds pressure without evidence of further decomposition.

37. On pressing rubber hydrochloride to felt at elevated temperatures which caused darkening of the rubber hydrochloride it was found that the addition of five parts hexamethylene tetramine per 100 parts rubber hydrochloride reduced or prevented darkening.

This invention also contemplates the transformation of perfectly flat sheets of rubber hydrochloride into sheets one or both surfaces of which are irregular. By this transformation the thickness of the film in certain areas may be decreased or increased, or a limited area of the sheet may be stretched to a desired size and shape. The rubber hydrochloride may be formed in the following way.

Twenty pounds of plasticized pale crepe rubber are dissolved in 313 pounds of benzene, giving a rubber cement of approximately 6% concentration. The cement is cooled to about 10° C. and hydrogen chloride gas is introduced into it while it is vigorously agitated. After about six hours the increase in weight of the composition due to the introduction of hydrogen chloride gas should be approximately 11.6 pounds which corresponds to a slight excess of available hydrogen chloride over that theoretically required by the empirical formula $(C_5H_9Cl)_x$. The introduction of hydrogen chloride is then discontinued and the reaction of the hydrogen chloride with the cement is allowed to progress until a washed and dried sample indicates that 29 to 30.5% of chlorine is combined with the rubber. Generally the time required is about 20 hours. The reaction mixture is then steam distilled to remove the benzene and the excess hydrogen chloride. The resulting mass is broken up on a rubber washer and washed thoroughly and dried in a vacuum at approximately 160° F. The rubber hydrochloride is then dissolved in chloroform or dichlorethylene in the ratio of about one part rubber hydrochloride to twenty parts of the solvent. The ageing properties of the film may be improved by adding a small amount of an antioxidant. Hexamethylene tetramine and methylene amino aceto nitrile are effective for this purpose. Where a colorless transparent film is desired it is advantageous to use 3% of ditetra hydro furfuryl amine or dicycle hexyl amine with 1½% of hexamethylene tetramine. The antioxidant is dissolved in the solvent with the washed reaction mass.

The invention will be further explained in connection with the drawing, in which—

Fig. 1 is a plan of apparatus showing one method of manufacturing the sheets of this invention.

Fig. 2 shows a frosted sheet with a clear window.

Fig. 3 shows a method of modifying a perfectly smooth sheet.

Fig. 4 shows a sheet with a protuberance therein; and

Fig. 5 shows apparatus for calendering or smoothing out a film of rubber hydrochloride, as explained below.

In making a film for wrapping purposes from a rubber hydrochloride solution such as described the material may be run onto a continuous belt in such an amount as to produce a film about 1/1000 of an inch thick after the solvent has been evaporated. Heat is applied and the solvent is evaporated slowly without boiling. A clear transparent film results. Irregularities in the under surface of the film are produced by using a belt having complementary irregularities in its surface. If a certain area of the film is to be depressed, that portion of the belt on which this area of the film is formed will be raised or a form of suitable shape may be fastened to the belt. If a portion of the film is to be raised to produce an embossed effect, the portion of the belt on which it is formed will be depressed. If a very thin film is produced, the variations in thickness are preferably kept at a minimum to prevent distortion of the film in drying. If a thicker sheet is to be formed somewhat greater variations in thickness are possible without causing distortion of the sheet. The raised or depressed portions may constitute a trade-mark or other design which may be merely for decorative purposes or they may comprise printed matter or may be used for any other purpose.

In Fig. 1 the apparatus for forming a sheet is shown as comprising two rollers, 5 and 6, over which a belt 7 is passed. A rubber hydrochloride solution is supplied to the belt through the pipe 8 and a perforated header 9. The belt travels in the direction of the arrow. The rubber hydrochloride solution after being applied to the belt is passed under the scraper or knife 10 to form a very thin film, and the guides 11 are provided to prevent the excess of the film from running over the edges of the belt. The belt and rollers are preferably enclosed in a chamber through which air or gas is circulated and the solvent evaporated. After passing over the roller 6 and returning to the roller 5, sufficient solvent has been evaporated to allow the film 12 to be removed from the belt. The film is then passed through further drying apparatus if necessary to remove the last traces of the solvent. Any desired design is formed by providing indentations or raised areas on the belt, depending upon whether the design is to be embossed on or engraved into the film. The drawing shows diamond shaped depressions 13 in the belt which produce raised areas 14 on the finished film.

By pebbling or cross-hatching, a frosted effect may be produced. By frosting only a portion of the surface and leaving another portion unfrosted a film is formed which when used for wrapping directs attention to that portion of the wrapped package which is seen through the unfrosted portion. Fig. 2 shows a section of the film 20 which is frosted over its entire surface except for the clear window 21 which may be made of any shape desired. Various novel effects in wrapping films may be produced by forming a film on a belt having an irregular surface.

Instead of forming films of irregular thickness in this way a perfectly uniform sheet of the rubber hydrochloride may first be formed on a belt having a perfectly smooth surface and this may be after-treated to produce the effects desired. The rubber hydrochloride is thermoplastic and while still warm from the process of manufacture or by heating, if necessary, the surface may be altered as desired and certain alterations in the surface may be made at room temperature by the proper application of pressure. The unsaturated hydrochloride produced in the manner above described is slightly extensible and can be marked by stamping without destroying its texture and waterproofing properties. Although stamping at room temperature produces some effect on a sheet or film, it is preferable to stamp in a press heated to 80–85° C. for example, or to first heat the sheet and then stamp it. Where depressed or raised areas of large dimension are to be formed, the sheet should be heated until it softens somewhat. The sheet may also be marked by passing it through rolls, after first passing it through heated rolls if necessary. Fig. 3 shows rollers 30 and 31. The upper roller 30 is provided with raised lines or ridges 32 which in pressing against the smooth surface of the roller 31 cause depressions 33 to be formed in the film 34. In this way lines may be pressed into one or both of the surfaces or ridges may be raised on one or both surfaces. Any desired portion of one or both surfaces may be altered to produce an engraved or embossed effect.

It often happens that for wrapping articles of irregular shape or for enclosing them in a protective layer which comprises a part of the article itself, or for covering or protecting an inner consistuent of a fabricated article a sheet which is not altogether flat is preferred to a perfectly flat sheet. For example, in wrapping a perfectly square article on which is a protruding handle, a sheet with a protuberance shaped to fit the handle is preferable to a perfectly flat sheet. Fig. 4 shows film 40 on which a protuberance 41 has been formed which is of predetermined shape. Thimble-like or finger-like protuberances or protuberances of large area and varying depth may be formed by stretching a limited area of a sheet of the rubber hydrochloride. Where a considerable amount of stretching is required, it is preferable to apply heat before or during the stretching. Such stretching may be accomplished by the gradual application of pressure between plates or rolls or in apparatus particularly designed for the purpose in which the stretching may be effected by the movement of one or more members after the area surrounding the part to be stretched has been tightly clamped in place. The protuberance may be shaped in a heated mold if this is desired.

If the sheet is to be stretched to any considerable extent, this may be advantageously accomplished by treatment of the sheet during its formation, before all of the solvent has been evaporated from it. For instance, in the manufacture of the rubber hydrochloride film from a solution of chloroform, after evaporating most of the solvent, for example when the solvent content has been reduced to about 10%, certain areas may be stretched to form desired protuberances, particularly if the stretching is effected while the film is still warm. The balance of the solvent may then be evaporated.

If considerable stretching is required to form the desired protuberance, the portion of the sheet which is to be stretched may be made somewhat thicker than the surrounding portion by forming it on a belt with depressed areas to give the desired thickness at the required portions of the film.

Although the invention relates more particularly to the manufacture of transparent films, it includes sheets of greater thickness and sheets which are not transparent. Colored sheets may be formed by the addition of dyestuffs.

The invention also contemplates spreading a solution of rubber hydrochloride in a volatile solvent on a suitable surface and after evaporating solvent from the exposed surface subjecting it to a "smoothing out" operation. This smoothing out is preferably effected while the film still contains a small amount of solvent and then the balance of the solvent is evaporated.

The film may advantageously contain between 5 and 15% by weight of solvent when subjected to the smoothing out operation to remove irregularities from the surface. For example, to produce a film of high transparency from rubber hydrochloride a solution of 7% of a partially saturated rubber hydrochloride (for example, rubber hydrochloride containing 29–30.5% chlorine) dissolved in benzene is spread out as a thin film on an endless smooth surfaced belt in such a way as to produce a continuous film. The benzene is allowed to evaporate, preferably with a forced draft, until its solvent content has been reduced to about 5 to 15% of the weight of the rubber hydrochloride. It is then passed between highly polished pressure rolls. This removes irregularities in the surface of the film from which the benzene has been volatilized. The film is then subjected to further drying to allow evaporation of the balance of the solvent. The highly polished rolls may if desired contain some marking or design to impress or emboss a figure or design upon the film, but the major portion of the rolls will be smoth and highly polished. A minimum temperature of about 150° F. is advantageously employed and for usual operating conditions 190° or 200° F. is preferred.

Various methods of smoothing out the film surface may be employed. For example, pressure may be applied to the film before it is removed from the surface on which it is formed as by applying pressure to the film before it is removed from the endless belt. If rollers are employed for smoothing out the surface of the film it may be advantageous to use a rubber covered roll or a hard rubber roll in combination with a steel roll, with the steel roll contacting with the surface of the film from which solvent has been evaporated, because of the difficulty in obtaining two steel rolls with surfaces of the exact uniformity required to calender a film with a thickness of the order of a thousandth of an inch. By using a roll with a resilient surface in combination with a steel roll any deviations from uniformity in the surface of the steel roll are compensated by the resilient roll and uniform pressure on the film is obtained.

The invention is illustrated diagrammatically in Fig. 5 of the accompanying drawing. The coated belt is indicated by numeral 51. The hood 52 is provided to carry off vapors of the solvent from the chamber enclosing the film. The solution of rubber hydrochloride is fed onto the belt through suitable means attached to the feed pipe 53. A spreader or scraper to regulate the thickness of the film is indicated at 54. The film 55 after the majority of the solvent has been evaporated is passed through the pressure rolls 56 and 57. The roll 56 is a steel roll. The roll 57 is preferably covered with rubber or other resilient material. The upper surface of the film from which solvent has evaporated contacts with the pressure roll 56. It is somewhat irregular as the film enters between the rolls 56 and 57, but the highly polished surface of the roll 56 smooths out irregularities present in the surface of the partially formed film. From these rolls the film passes through further drying means of suitable design here indicated by the drier 58 in which the film is festooned over rollers 59 and 60. Here air circulation means (not shown) removes the balance of the solvent through suitable vents (not shown).

The rubber hydrochloride may be made in any suitable way, such for example as that described in my issued Patent 1,989,632. It may advantageously contain a stabilizer such as those there mentioned. For example, it may contain about one per cent of hexamethylene tetramine. Films of any thickness may be prepared, which may be .005 to .002 inch thick, or thinner or thicker as described in said patent.

From the above it is seen that rubber hydrochloride can be compounded with a variety of ingredients and utilized in many ways. It can be molded to fabrics, etc. It can be molded into all sorts of shapes for use in the manufacture of electrical instruments and a multitude of other articles now made from other plastics.

This application is a division of application Serial No. 133,172, filed March 26, 1937, which is in part a continuation of my applications 682,116, filed July 25, 1933, and 102,225, filed September 23, 1936, which latter is in part a continuation of my application 2,843, filed January 22, 1935.

I claim:

1. A composition of matter comprising a rubber hydrohalide and litharge.

2. A plastic composition comprising as an essential ingredient a rubber hydrochloride intimately admixed with a minor proportion of a solid lead compound.

3. A plastic composition comprising as an essential ingredient a rubber hydrochloride intimately admixed with a minor proportion of lead oxide.

4. A plastic composition comprising as an essential ingredient a rubber hydrochloride intimately admixed with a minor proportion of litharge.

WILLIAM C. CALVERT.